United States Patent

Beinhocker et al.

[15] 3,654,392

[45] Apr. 4, 1972

[54] ELECTRONIC GAME BOARD SYSTEM

[72] Inventors: Gilbert D. Beinhocker, Cambridge, Mass.; John S. Galinato, Pacoima, Calif.

[73] Assignee: Gilbert D. Beinhocker, Belmont, Mass.

[22] Filed: Apr. 7, 1970

[21] Appl. No.: 26,365

[52] U.S. Cl. ..........................179/2 DP, 340/323, 273/136 A

[51] Int. Cl. ..........................H04m 11/06

[58] Field of Search ......................273/136 A; 340/323, 152; 178/18, 19; 179/2 R, 2 DP, 3, 4

[56] References Cited

UNITED STATES PATENTS

| | | | |
|---|---|---|---|
| 2,799,505 | 7/1957 | Lyons | 273/136 A |
| 3,515,814 | 6/1970 | Morgan | 179/2 DP |
| 3,131,259 | 4/1964 | Di Iorio | 179/2 |
| 3,539,995 | 11/1970 | Brandt | 178/19 |
| 3,524,023 | 8/1970 | Whang | 179/2 DP |

*Primary Examiner*—Kathleen H. Claffy
*Assistant Examiner*—Tom D'Amico
*Attorney*—Joseph Weingarten

[57] ABSTRACT

An automated electronic system for the remote communication and display of chess or other board game moves in real time via a voice-grade telephone line. Each player has an electronic console which includes a chess board operative to provide unique indication of each of the 64 squares of the board and means for sending and receiving coded representations of each move.

15 Claims, 9 Drawing Figures

INVENTORS
GILBERT D. BEINHOCKER
JOHN S. GALINATO
BY
ATTORNEYS

INVENTORS
GILBERT D. BEINHOCKER
JOHN S. GALINATO
BY
ATTORNEYS

INVENTORS
GILBERT D. BEINHOCKER
JOHN S. GALINATO
BY
ATTORNEYS

INVENTORS
GILBERT D. BEINHOCKER
JOHN S. GALINATO
BY [signatures]
ATTORNEYS

ELECTRONIC GAME BOARD SYSTEM

FIELD OF THE INVENTION

This invention relates to game apparatus and more particularly to a system for communicating and displaying chess moves or the like in real time via telephone line.

BACKGROUND OF THE INVENTION

There is no convenient way in which to play a game of chess when the players are physically separated from one another. Conventionally, in games played by mail, telegram or by telephone, the intended moves must be written or spoken to communicate the move to the other player. In the long time between moves in a mail game, or in the case of telephone chess games, recitation of the chess moves can detract from the concentration and intellectual pleasure of the game. Moreover, in such remotely played games, the players must know the universal chess code by which moves are communicated.

Apparatus is known wherein a player's move can be remotely indicated, for example, on a large display board such as may be used during tournament play. Systems have been proposed for playing chess and similar games where the players are physically separated from one another. Such systems in general have provided a means for communicating a move to the remotely located opponent and means for signalling instructions and various special conditions to the opponent. These systems have not found practical acceptance since they have in general been rather cumbersome and have often required complex interconnection by means of a large number of wires. Use of such systems proposed heretofore has also been limited to rather short distances, such as adjacent rooms of a building, by reason of the large number of interconnecting wires required.

SUMMARY OF THE INVENTION

In accordance with the present invention, a game of chess can be played over a telephone line by players separated by any distance and in a manner which does not detract from the pleasure of the game. The novel system includes a pair of electronic consoles, each including a chess board and each located for use by a game participant and operative to communicate and display moves without ambiguity. Each of the 64 squares on each board is uniquely coded and movement of any piece from one square to another causes transmission of unique codes indicating the move sequence. The coded data representing the move sequence is received at the remote playing site and is decoded to display the sequence of the moves on the remote board such as by flashing lights associated with the board squares.

Each of the 64 squares on the chess board is uniquely coded and, by reason of the logic of chess, indication of a move by remote indication of the squares from which a move is being made to the square to which a piece is moved completely defines the move to a player at the remote site. The encoded information is transmitted over a conventional telephone line, for example by means of an acoustic coupler, and is decoded at the receiving site to indicate the move sequence (on a "from/to" basis) on the opponent's board. Each player moves his opponent's pieces in the manner indicated by the transmitted move sequence such that each player can view his own chess board throughout the game as if the opponent were present and moving his own pieces. It will be appreciated that the game can be played according to the invention with substantially the same concentration and intellectual pleasure as when the game is played with the opponent physically present.

Sensing of moves is accomplished by lifting and placement of each piece on a square. Sensing can be accomplished for example by noting a change in signal level depending upon the presence or absence of a game piece on a particular square. Lifting of a piece from a square can cause a signal level change in one sense, while placement of a piece on a square can cause a signal level change of opposite sense, thereby noting a move sequence from a first square to a second square. The move sequence thus sensed is encoded according to the unique coding of the squares in question and the unique code transmitted via the interconnecting telephone line to the remote station where the received data is decoded to illuminate or otherwise actuate the corresponding squares of the opponent's board to denote the move being made.

A particularly satisfactory means for indicating a move sequence is to employ at the receiving site for a light sequence of two flashing lights which momentarily indicate the squares from which a piece is moved and to which the piece is moved. The squares themselves may be illuminated by individually associated lamps or the squares may be constructed of an electroluminescent material to facilitate signalling of move sequences.

Controls and indicators are provided to further automate the game communication. A signalling control is provided on each console to alert the opponent that a conversation is requested, in which case the phone can simply be lifted from the acoustic coupler for conversational use, after which the phone can be replaced onto the coupler for communication of game moves. When the telephone is removed from the coupler during the game, the board circuitry can be deactivated to prevent possible false move indication caused by room noise. A preparatory signal is transmitted to the remote site to signal that a move is about to be made. The opponent is thereby alerted so that he will not miss the impending move sequence noted by the flashing squares. A timer can also be provided to define an interval in which a move was not made or to indicate a move made outside of the allotted time.

It will be appreciated that the invention is also useful to communicate moves in a variety of other board games, such as checkers.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
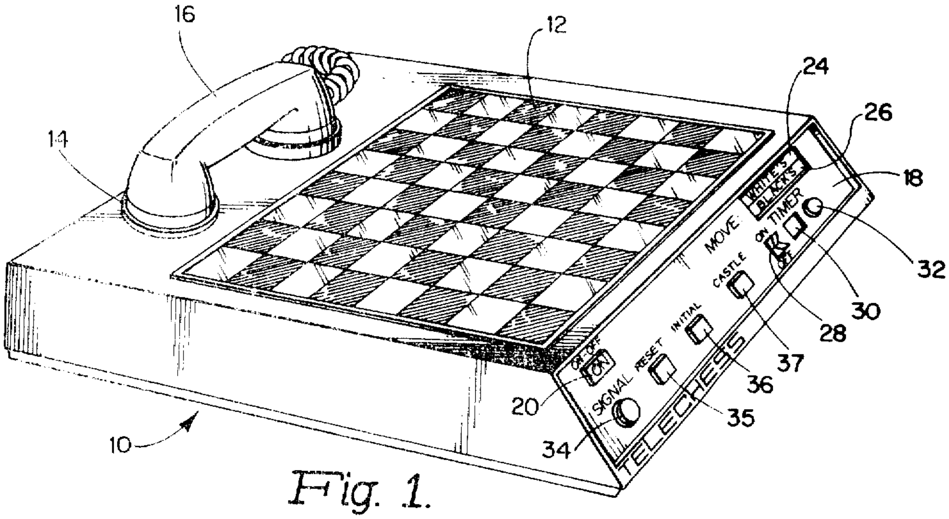
FIG. 1 is a pictorial view of a game playing console according to the invention.

A game playing console according to the invention is illustrated in FIG. 1 and is employed with a like console located at a remote site, the two consoles being coupled by means of a voice-grade telephone line such as employed for voice communications in a commercial telephone network. Since each console of the novel system is identical, only a single console need be described herein. Referring to FIG. 1, the console 10 includes a well known 64-square chess board 12, each square of which can be selectively illuminated, in a manner to be described, to indicate moves being made by the player at the remote playing site, and each square of which is cooperative with associated chess pieces to encode moves for communication to the receiving site. An acoustic coupler 14 is provided at the rear of console 10 adjacent board 12, the coupler being adapted to support a telephone handset 16 in operative relationship thereon for transmission and reception of data on a telephone line associated with a telephone employed. An operating panel 18 is provided on a sloping front side of console 10 and contains controls and indicators useful in the remote play of a game according to the invention.

The operating panel typically includes a POWER switch 20 which is illustrated as being of the illuminated type. Indicator lights 24 and 26, respectively labeled "WHITE" and "BLACK," provide a visual indication of whose move it is. A TIMER switch 28 is provided to initiate timing of an interval in which a move must be made. A buzzer 30 provides an audible alarm to warn of the approaching termination of a time interval for a move, while an indicator light 32 is provided to denote that a particular move was not made within the allotted time. A push button switch 34 labelled "SIGNAL" provides a means to manually signal the opponent that verbal communication is desired and to signal that a move is forthcoming, as will be described. For example, push button 34 can be depressed once to cause sounding of a single tone on the buzzer 30 at the receiving console to denote that a move is to be made, while repetitive actuation of push button 34 can cause a repetitive signal at the receiving site to denote that verbal communication via the telephone is desired.

A RESET switch 35 is provided by which the console can be reset to a receive mode, and is employed prior to commencement of a game to reset the console circuitry. An INITIAL switch 36 is also provided to set the console in a transmit mode. This switch is actuated by the player who is to have the first move, in a chess game this player being the one who has chosen the white pieces. Actuation of switch 36 causes illumination of the WHITE move light 24 and during play of a game, the WHITE move and BLACK move lights 24 and 26 will alternately be illuminated to properly denote whose move it is. A CASTLE switch 37 is provided to engage the logic circuitry necessary for signalling a castling move, since this is the only chess move in which two pieces are moved. The operation of the castling circuit will be described in detail hereinafter.

Figure 2:
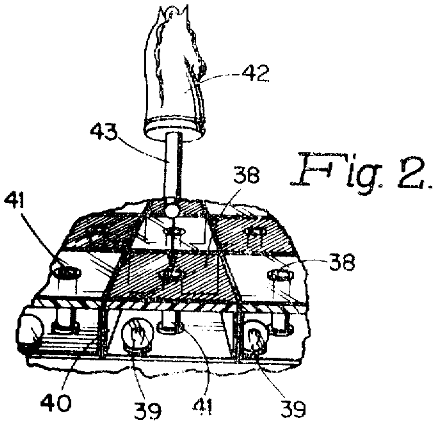
FIG. 2 is a cutaway pictorial view of one embodiment of a game board according to the invention.

As discussed, the game board 12 includes a plurality of squares, each of which can be selectively illuminated to signal a move and each of which is cooperative with an associated game piece to detect removal of a piece from a square and placement of a piece on a square. Illumination of the board squares can be accomplished in a variety of ways; for example, each square can be made of a translucent material such as glass or plastic and can be uniformly illuminated by a lamp disposed below the respective squares. Such an illumination arrangement is depicted in FIG. 2 and includes individual board squares 38, each constructed of a suitable translucent material and each having a lamp 39 disposed therebelow. Opaque panels 40 are provided as illustrated to prevent spurious illumination of a square by the lamp of adjacent squares. An electrical jack 41 is provided in each square, and the associated chess pieces 42 each have an electrical plug 43 adapted to mate with a respective jack. The jacks 41 each have an associated switch which is operative in response to removal of plug 43 therefrom or placement of plug 43 therein. These board switches are connected in a matrix and decoding and encoding logic circuitry is operative to detect a switch opening or switch closure occasioned by respective removal or placement of a playing piece on a square and to identify the particular square corresponding to the activated board switch. The lamps 39 for illuminating the board squares are similarly interconnected in a matrix which is energized under control of the logic circuitry to provide selective illumination of particular lamps to indicate a move sequence.

Figure 3:
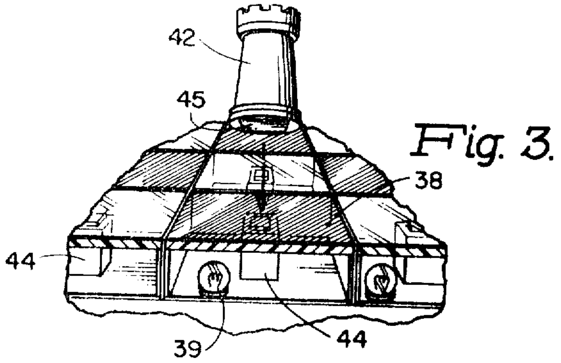
FIG. 3 is a cutaway pictorial view of an alternative embodiment of a game board according to the invention.

The chess board can also be implemented such that no switch hardware is visible on the playing board itself. Such a configuration is illustrated in FIG. 3 wherein magnetic switches 44 are employed beneath the chess board, with a single magnetic switch associated with and disposed adjacent the bottom surface of each board square 38. Each chess piece 42 in this embodiment has a plate 45, formed of metal or other magnetic material, on the bottom surface thereof such that placement of the chess piece on a board square causes actuation of the associated magnetic switch by reason of the proximity of the magnetic plate 45 associated with the chess piece.

Figure 4:
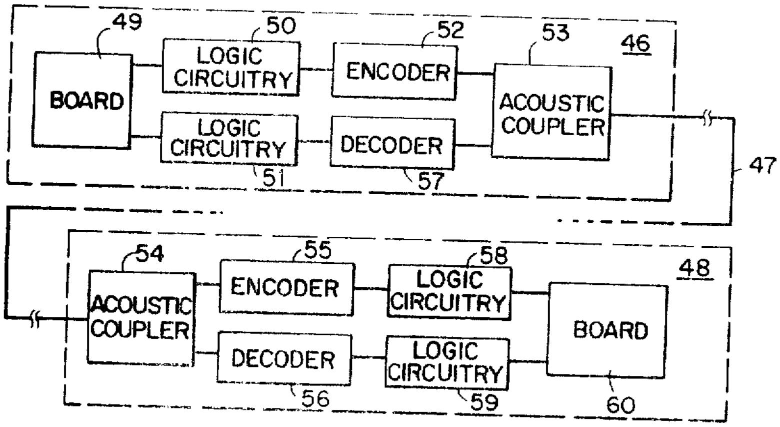
FIG. 4 is a block diagram of a board game system according to the invention.

The logic system for achieving operation of the invention is shown in FIG. 4. The system includes a console 46 coupled via a telephone line 47 to a second console 48, each console being operative to transmit coded data to the other and to receive data therefrom. Console 46 includes a game board 49 operative to detect the movement of pieces thereon, logic circuitry 50 and 51, an encoder 52 coupling logic 50 to an acoustic coupler 53 and a decoder 54 coupling logic 54 to coupler 53. The acoustic coupler interconnects console 46 and console 48 via the telephones associated with the respective consoles. Console 48 is identical to console 46 and includes an acoustic coupler 54 connected to an encoder 55 and a decoder 56, in turn connected to respective logic circuitry 58 and 59 and thence to game board 60.

Each square of the game board is uniquely coded with a digital number representing squares 1 through 64 such that any particular square is uniquely designated by its coded representation. The rules of chess impose precise constraints on the available moves which may be made and thus a move can be fully defined by indicating the squares from which and to which a move is being made. The chess pieces themselves need not be encoded.

In operation, lifting of a piece 42 from a square on board 49 causes application of a signal to logic 50 which, in turn, energizes encoder 52 to provide a coded representation of the square from which the chess piece was lifted. This coded representation, typically one or more audio tones, is transmitted by means of acoustic coupler 53 and telephone line 47 to console 48 wherein the received information is decoded in decoder 56 and logic 59 to energize the corresponding square of board 60. Similarly, placement of a piece 42 on the square to which the move is being made causes generation of a unique code representative of that square, which is transmitted to the remote console for decoding and display of the corresponding square to which the move is made. Thus, the remote illumination of two board squares completely defines the transmitted move. The player at the receiving site moves his opponent's piece in the manner indicated by the move sequence. If an opponent's piece is already on the square to which a move is being made, then by the rules of chess the opponent's piece is taken. The castling move involves double movement of King and Rook and is accomplished according to the invention in a manner to be described hereinafter.

Figure 5:
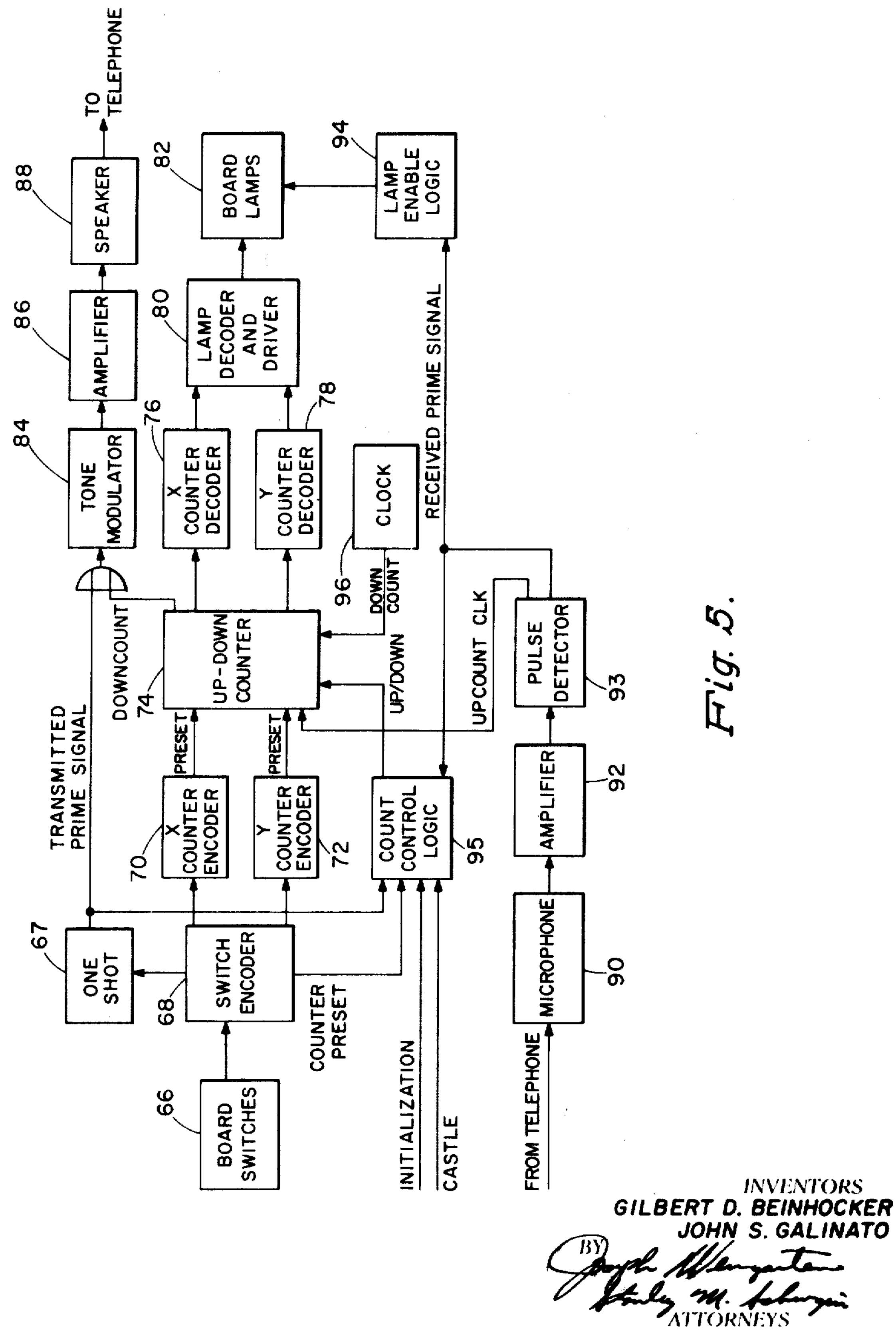
FIG. 5 is a block diagram of the logic circuitry of the console of FIG. 1.
Figure 6:
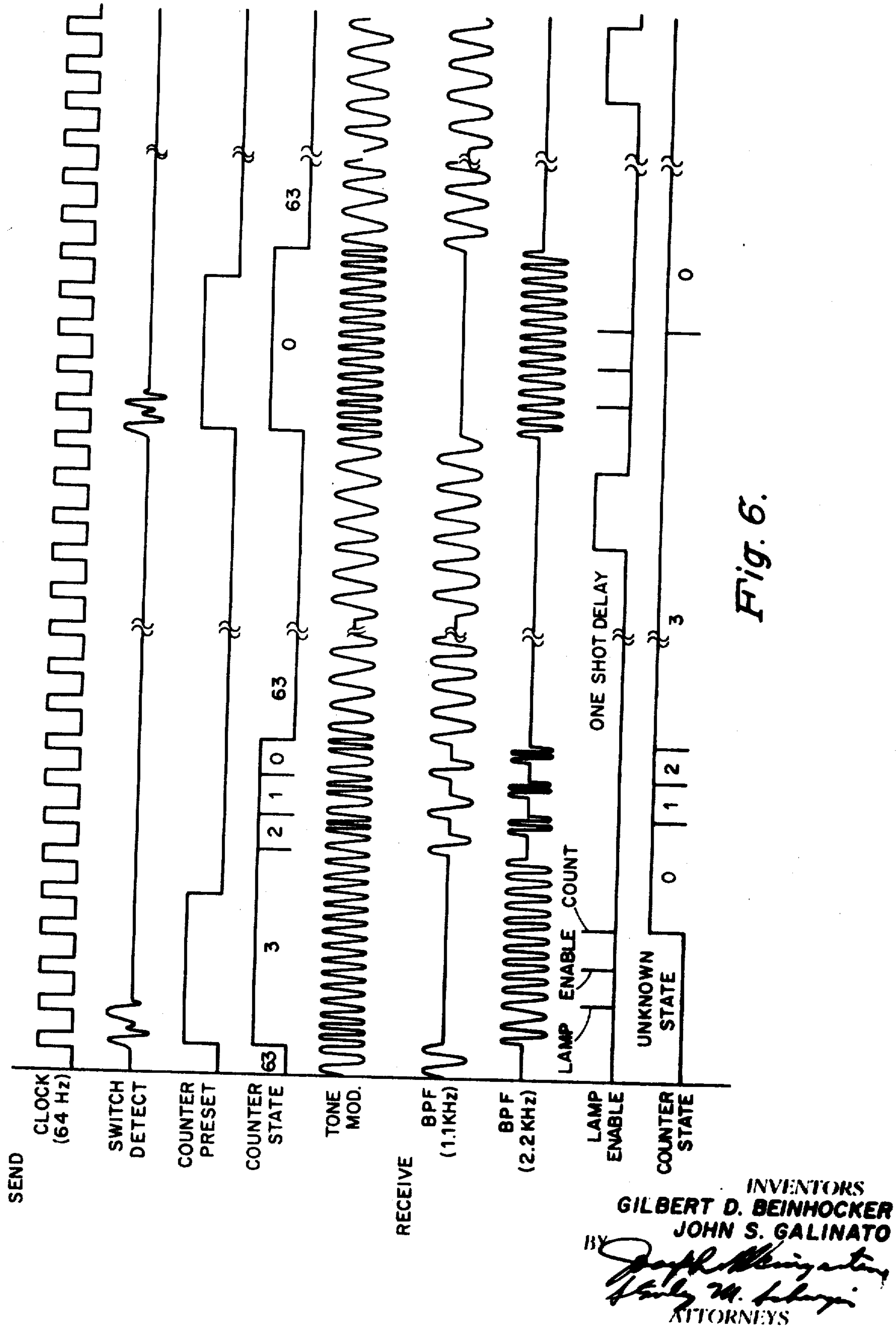
FIG. 6 is a timing diagram useful in illustrating operation of the invention.

The logic system of the electronic console is illustrated in FIG. 5 and the system timing diagram is shown in FIG. 6. An array of board switches 66 such as described above is associated with the playing board such that removal of a piece from its square opens a corresponding switch while placement of a piece on a square closes a corresponding switch. There are 64 switches, one for each square, and operation of each switch causes a change in voltage level which is sensed and encoded to identify the particular square.

A switch encoder 68 translates the 64 switch positions into eight row (X) lines and eight column (Y) lines of the switch matrix and are respectively applied to an X counter encoder 70 and a Y counter encoder 72. The switch encoder 68 also includes circuitry for generation of a counter preset pulse for presetting of counter 74. Switch encoder 68 also provides a signal to a one shot multivibrator 67, which produces a prime signal which is applied via an OR gate 75 to tone modulator 84. The prime signal is a pulse train which is larger than the coded pulse trains representing the board locations and which is generated upon lifting a game piece from its square. This prime signal is operative to denote an impending move and sets the receiving console in a receiving mode of operation. Counter encoders 70 and 72 each encode the row and column information applied thereto into a signal format for operation of an up-down counter 74. Counter 74 typically is a six bit, 64 state counter operative to count up a number of states corresponding to the number of tone pulses received via the telephone line and is also operative to be preset to one of 64 states by the coded representation of the board switch circuitry and to count down to zero from the preset state.

In a receive mode of operation, counter 74 is operative to energize an X counter decoder 76 and a Y counter decoder 78 which, in turn, are operative to energize a lamp decoder and driver 80. Each counter decoder 76 and 78 is operative in response to signals from counter 74 to provide eight lines of row information and eight lines of column information to suitably activate lamp decoder and driver 80. Lamp decoder and driver 80 are operative in a matrix configuration to selectively activate one of the 64 board lamps 82 associated with the playing board.

In the transmit mode, counter 74 applies a pulse train via OR gate 75 to tone modulator 84 which generates signals at one or the other of two selected frequencies. The frequencies are within the transmission band of the associated telephone line and are sufficiently separated to permit suitable filtering at the receiving console. Typically, the tone frequencies can be 1.1 KHz. and 2.2 KHz. The tones thus produced are amplified in amplifier 86 and applied to a speaker 88 which is part of the acoustic coupler and operative to provide a suitable audio level for transmission of the tone data over the telephone line to the like console at the receiving site.

Information received from a transmitting console is coupled via a microphone 90 of the acoustic coupler to an amplifier 92 and thence to a pulse detector 93. The output from pulse detector 93 is applied to counter 74 and to lamp enable logic 94 and count control logic 95. A clock 96 provides clock pulses to counter 74 in its down-count mode. Lamp enable logic 94 controls energization of board lamps 82 to provide momentary illumination of the lamps after each move has been received and processed.

Typical signal formats for the system of FIG. 5 are shown in FIG. 6, specific reference to which is now made. The switch detect signal is caused by closing or opening of a board switch by placement of a game piece on a board square or removal thereof from a square. The counter preset signal is provided by switch encoder 68 to cause control logic 95 to enable counter 74 in its down count mode and to permit presetting thereof by binary signals from encoders 70 and 72. A clock pulse train is produced by clock 96 for operation of counter 74 in counting down from a preset count to zero to cause transmission of a code representing the identity of an actuated board square. The counter state pulses represent the counter preset to identify square "3" and counted down to its zero state to transmit the square identity. Modulator 84 provides the tone signal which is an audio tone modulated by the clock train and one of one frequency, typically 2.2 KHz., when the clock is low, and of another frequency, typically 1.1 KHz., when the clock is high.

At the receiving console, the received modulated tone is filtered by bandpass filters 100 and 101 (FIG. 7) of pulse detector 93 to recover the separate 1.1 KHz. and 2.2 KHz. tones which are employed to drive counter 74 up to a state representing the identity of an actuated square. The lamp enable sequence includes a delay interval during which counter 74 is set to the state representing the identity of a board square, after which the associated board lamp is energized by lamp and enable signals from decoder 80 and logic 94 respectively.

Figure 7:
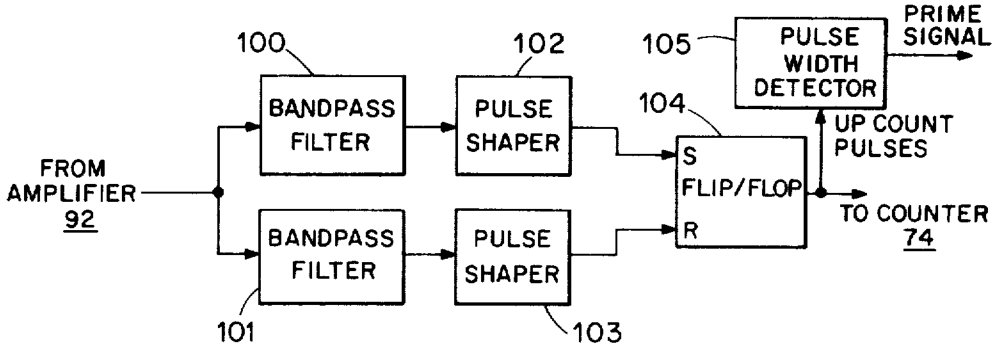
FIG. 7 is a block diagram of an embodiment of the pulse detector of FIG. 5.

The pulse detector 93 is illustrated in a typical implementation in FIG. 7 and includes a pair of bandpass filters 100 and 101, each connected to a respective pulse shaper 102 and 103, which in turn are connected to the set and reset terminals, respectively, of a flip-flop 104. The filters 100 and 101 are tuned respectively to the two tones transmitted from the transmitting console. The pulses derived from the received modulated pulses cause alternate setting and resetting of flip-flop 104 which provides up-count pulses to counter 74. A pulse width detector 105 is responsive to the longer pulse train initially transmitted to provide a received prime signal for enabling the receiving mode of operation. The received prime signal is applied by way of the counter control logic 95 (FIG. 5) to set the counter 74 in an up-count mode for receiving.

Figure 8:
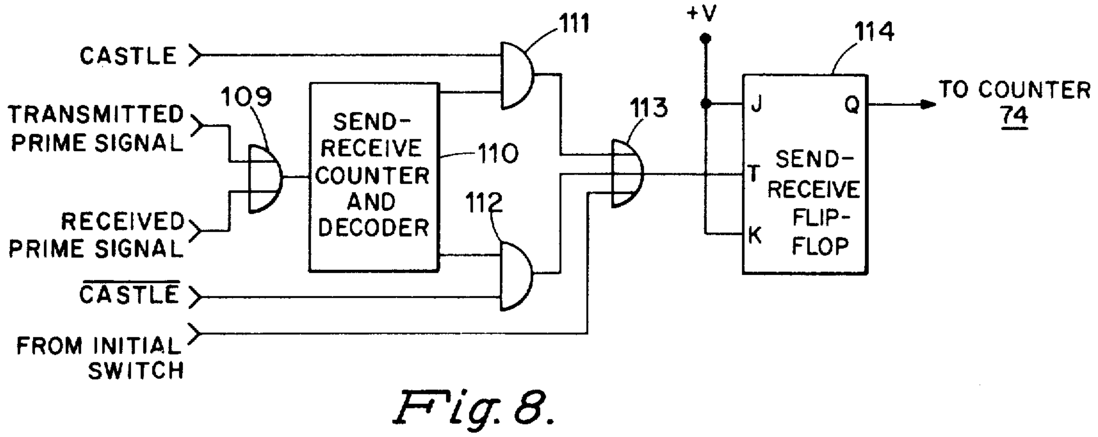
FIG. 8 is a block diagram of an embodiment of the count control logic of FIG. 5.

The counter control logic is illustrated more particularly in FIG. 8 and includes a send-receive counter and decoder 110 connected via AND gates 111 and 112 and OR gate 113 to a JK flip-flop 114. The transmitted prime signal and the received prime signal are each applied to counter and decoder 110 by way of OR gate 109. A castle signal and its reciprocal signal ($\overline{\text{CASTLE}}$), derived from the CASTLE switch 37 are applied via respective gates 111 and 112 to OR gate 113 and thence to flip-flop 114. An initial signal from switch 36 is applied via OR gate 113 to flip-flop 114. The send or receive mode is established by the state of flip-flop 114. The counter 74 is set in an up-count mode for receiving and in a down-count mode for transmitting.

It will be appreciated that a transmitted prime signal is generated twice during a move sequence, once when a piece is lifted from its square and again when the piece is placed on another square. Counter and decoder 110 is operative to count the transmitted prime signals and to produce an output signal after two such prime signals have been received. This output signal is applied to AND gate 112 together with the reciprocal castle signal which is present except when a castling-move is selected. The output signal from gate 112 is directed via OR gate 113 to the trigger input of flip-flop 114 to cause an output signal which sets counter 74 in a down-count mode for transmitting.

Similarly, the receipt of two received prime signals causes an output signal to AND gate 112 which provides a signal via gate 113 to flip-flop 114, causing a change of state which sets counter 74 in an up-count mode for receiving. Counter 74 is thus alternately set after the sending or receiving of two coded square positions into a transmitting or a receiving mode to affect generation and receipt of move sequences.

The castling move requires the double movement of pieces and counter and decoder 110 is also operative to count four transmitted and received prime signals, as provided during a castling move sequence, and to provide an output signal to AND gate 111 after receipt of four such signals. Gate 111 also receives a castle signal from the castle switch 37 and provides a signal via OR gate 113 to flip-flop 114 to cause a change of state. Thus, during a castling move, counter 74 remains in a transmitting or a receiving state until the four coded square positions have been either sent or received, as the case may be. In response to a castle signal provided by actuation of the CASTLE switch 37, the counter decoder 110 provides a second output operative to permit transmission of a four square move sequence such as encountered only during a castling move.

Figure 9:
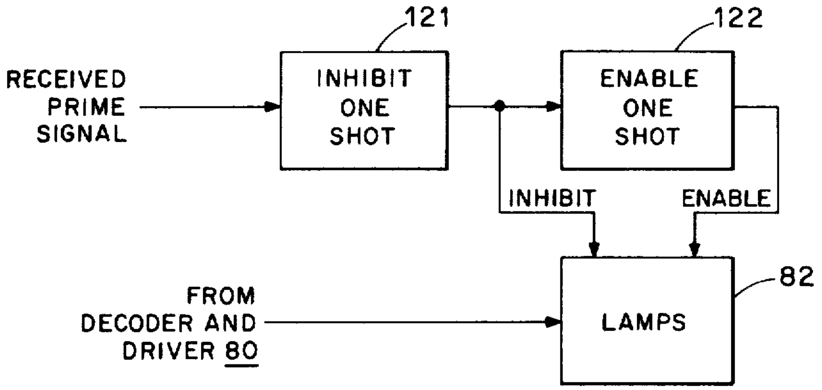
FIG. 9 is a block diagram of an embodiment of the lamp enable logic of FIG. 5.

The lamp enable circuit is shown in greater detail in FIG. 9. The received prime signal from pulse detector 93 is applied to an inhibit one shot 121, which in turn applies a signal to an enable one shot 122. After a predetermined time delay provided by one shot 121, an inhibit signal is directed to board lamp 82, and after a second time delay provided by one shot 122, an enable signal is directed to lamp 82. In this manner the board lamps are enabled only after a valid move signal has been received and processed. The invention has an inherent self-checking feature in that noise which may be processed by the system will in all probability cause an illegal move sequence which would be indicative of an error condition.

In operation, to communicate a move from a selected square to another, a particular chess piece is moved in a selected sequence causing opening of the board switch associated with the square from which the piece is removed and subsequent closing of the board switch 66 associated with the square to which the piece is moved. Opening of a board switch 66 causes a prime signal to be transmitted which sets the counter 74 in the receiving console in a receive mode, and causes a signal from switch encoder 68 which is operative to identify the location of the opened switch by its matrix position, and to apply row and column signals to counter encoders 70 and 72 which translate this matrix information into a binary code for presetting of counter 74. Counter 74 is thus preset to a count representative of the actuated board switch position and, under the government of clock 96, counter 74 is counted down to its zero state to yield a number of pulses corresponding to the identity of the actuated board square switch. The output pulses from the counter 74 are applied to a tone modulator 84 which converts the pulses into audio frequency tones which are amplified in amplifier 86 to an audio level suitable for driving of a speaker 88 which is part of the acoustic coupler to apply the audio tones to the telephone line for transmission to the receiving console.

At the receiving station, the audio signals received by the local telephone are applied to microphone 90 which provides a pulse modulated output signal to an amplifier 92, the output signal of which is applied to a pulse detector 93 which detects the envelope of the pulse modulated signal and applies the received prime signal to the up-count system for enabling the receiving mode and also applies signals to counter 74 to cause the counter to be driven to a count representative of the position of the actuated board switch at the transmitting console. The settling count in counter 74 is decoded by counter decoders 76 and 78 which provide row and column information to lamp decoder and driver 80 and to lamp enable logic 94 for actuation of a particular board lamp corresponding to the board square associated with the actuated switch.

Various modifications and alternative implementations of the invention will occur to those versed in the art without departing from the true scope and spirit of the invention. For example, the electronic circuitry can be implemented in many ways, and transmission paths other than telephone lines can be employed, such as radio links. A relatively large display board can also be employed in conjunction with the game playing consoles for displaying moves to an audience. Such a display board can be identical to the console boards but without the operating controls and indicators and interconnection of such a display board into the system can be accomplished in a well-known manner. In addition, a plurality of consoles can be multiplexed onto a single transmission path in a well-known manner. Accordingly, it is not intended to limit the invention by what has been particularly shown and described, except as indicated in the appended claims.

What is claimed is:

1. A board game system comprising:
first and second electronic consoles each adapted to communicate with the other via a common transmission path and each adapted to transmit a move sequence of a game piece to the other console and to display a move sequence received from the other console, each of said consoles including:
a multiple square game board each square including illumination means and switch means for detecting the lifting of a game piece therefrom and for detecting the placement of a game piece thereon;
logic circuitry operative in response to signals from said switch means to provide a unique coded representation of the board squares from which a game piece is lifted and on which a game piece is placed to thereby provide a coded representation of a move sequence;
means for transmitting a signal representative of said coded move sequence over said common transmission path to the other console;
means for receiving a signal from said transmission path representative of a transmitted move sequence;
logic decoding circuitry operative to decode the received signal to provide selective illumination of said illumination means to indicate the transmitted move sequence.

2. A board game system according to claim 1 wherein said switch means and said illumination means are each arranged within a respective matrix, and said logic circuitry includes encoding means operative to provide a coded signal representative of the coordinate position of the board squares associated with a move sequence, and said logic decoding circuitry includes decoding means operative to provide a coded signal representative of the coordinate position of the board squares associated with a move sequence.

3. A board game system according to claim 1 wherein said logic circuitry includes:
an up-down counter operative in response to said coded representation of a move sequence to provide an output pulse train representative of the identity of the board squares from which a game piece is lifted and on which a game piece is placed.

4. A board game system according to claim 3 wherein said signal transmitting means includes a tone modulator operative to provide tone signals corresponding and in response to said pulse train from said counter.

5. A board game system according to claim 3 wherein said first and second consoles are each coupled to said common transmission path by means of an acoustically coupled telephone.

6. A board game system according to claim 5 wherein said signal transmitting means includes a tone modulator operative to provide tone signals corresponding and in response to said pulse train from said counter; and
a loudspeaker operative in response to said tone signals to provide audio tones to said transmission path.

7. A board game system according to claim 5 wherein said signal receiving means includes:
a microphone operative to receive audio signals from said transmission path; and
a pulse detector operative in response to signals from said microphone to provide pulse signals representative of a transmitted move sequence.

8. A board game system according to claim 1 wherein said logic circuitry includes:
an up-down counter operative in a transmitting mode to be preset to numbers representative of the board squares associated with a move sequence and to provide a pulse train representative of said move sequence, and operative in a receiving mode to count up to numbers representative of a transmitted move sequence.

9. A board system according to claim 8 wherein said logic decoding circuitry includes first and second decoders operative in response to said pulse train from said counter to provide matrix interrogation signals for said illumination means matrix to selectively illuminate said board squares associated with the transmitted move sequence.

10. A board game system according to claim 1 wherein said illumination means are momentarily actuated to denote a move sequence by means of flashing board squares associated with the move sequence.

11. A board game system according to claim 1 wherein said game board is a chess board and said logic circuitry includes means for providing a coded representation of a castling move sequence.

12. A chess game system comprising:
first and second electronic consoles each adapted to communicate with the other via a common transmission path and each adapted to transmit a coded move sequence of a game piece to the other console and to display a move sequence received from the other console, each of said consoles including:
a multiple square chess board each square of which includes switch means and illumination means, said switch means and said illumination means each being connected in a row and column matrix configuration conforming to said chess board;
a matrix encoder coupled to said switch means matrix and operative upon removal of a game piece from a board square or placement of a game piece thereon to provide first row and column matrix signals unique to that board square;
first logic circuitry coupled to said matrix encoder and operative to provide a binary coded representation of the identity of the board squares of a move sequence defined by removal of a game piece from one of said board squares and placement of said game piece onto another one of said board squares;

means operative in response to said binary coded representation to transmit a signal representative of said move sequence over said common transmission path to the other one of said consoles;

means for receiving a signal from said common transmission path representative of a transmitted move sequence;

second logic circuitry coupled to said receiving means and operative to provide a binary coded representation of the identity of the board squares associated with said transmitted move sequence;

a matrix decoder operative in response to said binary coded representation of said second logic circuitry to provide second row and column matrix signals; and means for applying said second row and column matrix signals to said illumination means matrix to illuminate the board squares of said transmitted move sequence.

13. A chess game system according to claim 12 wherein said first named means includes:

an up-down counter operative in a transmitting mode to be preset to a number corresponding to said binary coded representation and to provide a pulse train representative of said move sequence;

and wherein said second logic circuitry includes said up-down counter operative in a receiving mode to count up to a number representative of said binary coded representation of said second logic circuitry.

14. A chess game system according to claim 13 including:

means coupled to said matrix encoder and operative to provide a transmitted control signal to denote an impending move sequence;

and wherein said signal receiving means includes means operative in response to said transmitted control signal to provide a second control signal for setting said counter in an up count mode.

15. A chess game system according to claim 12 including on each of said first and second electronic consoles:

control means for indicating a castling move to be made; and means operative in response to said control indication to cause transmission of a signal representative of a double move sequence defining said castling move.

* * * * *